(12) United States Patent
Frick

(10) Patent No.: US 10,975,964 B2
(45) Date of Patent: Apr. 13, 2021

(54) MANUAL TRANSMISSION CONTROL FOR A VEHICLE

(71) Applicant: GM Global Technology Operations LLC, Detroit, MI (US)

(72) Inventor: Stefan Michael Frick, West Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 16/430,942

(22) Filed: Jun. 4, 2019

(65) Prior Publication Data

US 2020/0386309 A1 Dec. 10, 2020

(51) Int. Cl.
*F16H 59/04* (2006.01)
*F16H 61/688* (2006.01)
*F16H 59/56* (2006.01)

(52) U.S. Cl.
CPC ......... *F16H 61/688* (2013.01); *F16H 59/044* (2013.01); *F16H 59/56* (2013.01)

(58) Field of Classification Search
CPC ....... F16H 61/688; F16H 59/044; F16H 59/56
See application file for complete search history.

(56) References Cited

U.S. PATENT DOCUMENTS

| | | | |
|---|---|---|---|
| 10,359,802 B2* | 7/2019 | Brown | B60W 10/02 |
| 2005/0143220 A1* | 6/2005 | Berger | B60W 30/18054 477/96 |
| 2011/0036191 A1* | 2/2011 | Wolterman | F16D 48/06 74/473.12 |
| 2011/0226086 A1 | 9/2011 | Kirchner | |
| 2016/0327156 A1* | 11/2016 | Kumar | F16H 59/0208 |
| 2018/0252274 A1 | 9/2018 | Rodrigues et al. | |
| 2019/0049000 A1* | 2/2019 | Rodriguez | B60W 30/165 |
| 2020/0039500 A1* | 2/2020 | Lim | F16H 63/50 |
| 2020/0200259 A1* | 6/2020 | Fodor | F16H 59/0217 |

* cited by examiner

*Primary Examiner* — David J Hlavka

(57) ABSTRACT

A powertrain system includes a clutch pedal module, a gear selector module, a powertrain control module, a motor, and a transmission. The clutch pedal is selectively disposed in one of a first clutch position and a second clutch position. The gear shift lever is selectively disposed in one of a plurality of forward gear positions and a reverse gear position. The powertrain control module operates a control logic sequence to convert the input signals to a plurality of transmission output signals. The transmission is an automatic transmission operating in a manual mode having gear selection controlled by the driver.

19 Claims, 3 Drawing Sheets

MANUAL TRANSMISSION CONTROL FOR A VEHICLE

INTRODUCTION

The present disclosure relates generally to a powertrain system for a vehicle and more particularly to a powertrain system having a driver manually controlled transmission.

Vehicle manufacturers are incorporating improved technology into vehicles that improve fuel efficiency, performance, and driver experience. Chief among the improved hardware includes automatic transmissions having more gear ratios as well as automating functions that were previously driver controlled. However, while some customers have welcomed new technologies others have expressed regret that the driver's experience has become less enjoyable by disconnecting the driver from the vehicle. Thus, manufacturers are developing ways to incorporate new technology demanded by rising requirements while maintaining and improving the driver experience.

Accordingly, there is a need in the art for a new powertrain system for a vehicle that improves fuel efficiency and other regulated performance standards yet maintains or improves the driver's experience.

SUMMARY

A powertrain system of a vehicle is provided. The powertrain system includes a clutch pedal module, a gear selector module, a powertrain control module, and a transmission. The clutch pedal module has a clutch pedal and a clutch sensor. The clutch pedal is selectively disposed in one of a first clutch position and a second clutch position. The gear selector module has a gear shift lever and a plurality of gear lever position sensors. The gear shift lever is selectively disposed in one of a plurality of forward gear positions and a reverse gear position. The powertrain control module has a control logic sequence. The powertrain control module is in electrical communication with each of the clutch pedal sensor and the plurality of lever position sensors. The transmission has a plurality of forward gear ratios and a reverse gear ratio. The transmission is in electric communication with the powertrain control module. The powertrain control module receives a plurality of input signals from the clutch pedal sensor and the plurality of gear lever position sensors. The powertrain control module operates the control logic sequence to convert the input signals to a plurality of transmission output signals. The powertrain control module communicates the plurality of transmission output signals to the transmission.

In one example of the present disclosure, the powertrain control module is also in electrical communication with a motor of the vehicle and the powertrain control module communicates a plurality of motor output signals generated by the control logic sequence to the motor.

In another example of the present disclosure, the plurality of forward gear positions include at least a first gear position, a second gear position, a third gear position, a fourth gear position, and a neutral position. The plurality of lever position sensors includes a first through fourth gear sensors. The first gear sensor detects when the gear shift lever is in the first gear position. The second gear sensor detects when the gear shift lever is in the second gear position. The third gear sensor detects when the gear shift lever is in the third gear position. The fourth gear sensor detects when the gear shift lever is in the fourth gear position. The neutral gear sensor detects when the gear shift lever is in the neutral position. The reverse gear sensor detects when the gear shift lever is in the reverse gear position.

In yet another example of the present disclosure, the first clutch position is a fully disengaged clutch position, the second clutch position is a fully engaged clutch positon, and a third clutch position is a partially engaged clutch position.

In yet another example of the present disclosure, the partially engaged clutch position is one of a 10% partially engaged clutch positon, a 25% partially engaged clutch positon, a 50% partially engaged clutch positon, and a 75% partially engaged clutch positon.

In yet another example of the present disclosure, the clutch sensor detects when the clutch pedal is disposed in one of the first, second, and third positions.

In yet another example of the present disclosure, the transmission is a dual clutch transmission having a first torque input clutch, a second torque input clutch, and a plurality of torque transmitting mechanisms.

In yet another example of the present disclosure, a first of the plurality of input signals is a clutch pedal position input signal. A second of the plurality of input signals is a gear lever position input signal. The control logic sequence includes a first control logic for selectively activating one of the first and second torque input clutches based on the clutch pedal position signal and the gear lever position signal.

In yet another example of the present disclosure, the control logic sequence includes a second control logic for selectively activating one of the plurality of torque transmitting mechanisms based on the gear lever position signal.

Another example of a powertrain system of a vehicle is provided in the present disclosure. The powertrain system includes a clutch pedal module, a gear selector module, a powertrain control module, a transmission, and a motor. The clutch pedal module has a clutch pedal and a clutch sensor. The clutch pedal is selectively disposed in one of a fully engaged clutch position, a fully disengaged clutch position, and a partially engaged clutch position. The gear selector module has a gear shift lever and a plurality of gear lever position sensors. The gear shift lever is selectively disposed in one of a plurality of forward gear positions and a reverse gear position. The powertrain control module has a control logic sequence. The powertrain control module is in electrical communication with each of the clutch pedal sensor and the plurality of lever position sensors. The transmission has a plurality of forward gear ratios and a reverse gear ratio. The transmission is in electric communication with the powertrain control module. The motor has an output member selectively connected for common rotation with one of the first and second input clutches of the transmission. The powertrain control module is also in electrical communication with the motor. The powertrain control module receives a plurality of input signals from the clutch pedal sensor and the plurality of gear lever position sensors. The powertrain control module operates the control logic sequence to convert the input signals to a plurality of transmission output signals and a plurality of motor output signals. The powertrain control module communicates the plurality of transmission output signals to the transmission, and communicates the plurality of motor output signals to the motor.

In one example of the present disclosure, the plurality of forward gear positions include at least a first gear position, a second gear position, a third gear position, a fourth gear position, and a neutral position. The plurality of lever position sensors includes first through fourth gear sensors. The first gear sensor detects when the gear shift lever is in the first gear position. The second gear sensor detects when the gear shift lever is in the second gear position. The third gear sensor detects when the gear shift lever is in the third gear position. The fourth gear sensor detects when the gear shift lever is in the fourth gear position. The neutral gear sensor detects when the gear shift lever is in the neutral position. The reverse gear sensor detects when the gear shift lever is in the reverse gear position.

In one example of the present disclosure, the partially engaged clutch position is one of a 10% partially engaged clutch, a 25% partially engaged clutch, a 50% partially engaged clutch, and a 75% partially engaged clutch.

In another example of the present disclosure, the clutch sensor detects when the clutch pedal is disposed in one of the fully engaged clutch position, the fully disengaged clutch position, and the partially engaged clutch position.

In yet another example of the present disclosure, the transmission is a dual clutch transmission having a first torque input clutch, a second torque input clutch, and a plurality of torque transmitting mechanisms.

In yet another example of the present disclosure, a first of the plurality of input signals is a clutch position input signal. A second of the plurality of input signals is a gear lever position input signal. The control logic sequence includes a first control logic for selectively activating one of the first and second torque input clutches based on the clutch position signal and the gear lever position signal.

In yet another example of the present disclosure, the control logic sequence includes a second control logic for selectively activating one of the plurality of torque transmitting mechanisms based on the gear lever position signal.

Another example of a powertrain system of a vehicle is provided in the present disclosure. The powertrain system includes a clutch pedal module, a gear selector module, a powertrain control module, a dual clutch transmission, and a motor. The clutch pedal module has a clutch pedal and a clutch sensor. The clutch pedal is selectively disposed in one of a fully engaged clutch position, a fully disengaged clutch position, and a partially engaged clutch position. The clutch sensor detects when the clutch pedal is disposed in one of the fully engaged clutch position, the fully disengaged clutch position, and the partially engaged clutch position. The partially engaged clutch position is one of a 10% partially engaged clutch, a 25% partially engaged clutch, a 50% partially engaged clutch, and a 75% partially engaged clutch.

The gear selector module has a gear shift lever and a plurality of gear lever position sensors. The gear shift lever is selectively disposed in one of a plurality of forward gear positions and a reverse gear position. The powertrain control module has a control logic sequence. The powertrain control module is in electrical communication with each of the clutch pedal sensor and the plurality of lever position sensors. The dual clutch transmission has a first torque input clutch, a second torque input clutch, a plurality of torque transmitting mechanisms, a plurality of forward gear ratios, and a reverse gear ratio. The dual clutch transmission is in electrical communication with the powertrain control module.

The motor has an output member selectively connected for common rotation with one of the first and second input clutches of the transmission. The powertrain control module is also in electrical communication with the motor. The powertrain control module receives a plurality of input signals from the clutch pedal sensor and the plurality of gear lever position sensors. The powertrain control module operates the control logic sequence to convert the input signals to a plurality of transmission output signals and a plurality of motor output signals. The powertrain control module communicates the plurality of transmission output signals to the transmission and communicates the plurality of motor output signals to the motor.

In one example of the present disclosure, the plurality of forward gear positions include at least a first gear position, a second gear position, a third gear position, a fourth gear position, and a neutral position. The plurality of lever position sensors includes a first through fourth gear sensors. The first gear sensor detects when the gear shift lever is in the first gear position. The second gear sensor detects when the gear shift lever is in the second gear position. The third gear sensor detects when the gear shift lever is in the third gear position. The fourth gear sensor detects when the gear shift lever is in the fourth gear position. The neutral gear sensor detects when the gear shift lever is in the neutral position. The reverse gear sensor detects when the gear shift lever is in the reverse gear position.

In another example of the present disclosure, a first of the plurality of input signals is a clutch position input signal. A second of the plurality of input signals is a gear lever position input signal. The control logic sequence includes a first control logic for selectively activating one of the first and second torque input clutches based on the clutch position signal and the gear lever position signal.

In yet another example of the present disclosure, the control logic sequence includes a second control logic for selectively activating one of the plurality of torque transmitting mechanisms based on the gear lever position signal.

The above features and advantages and other features and advantages of the present disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
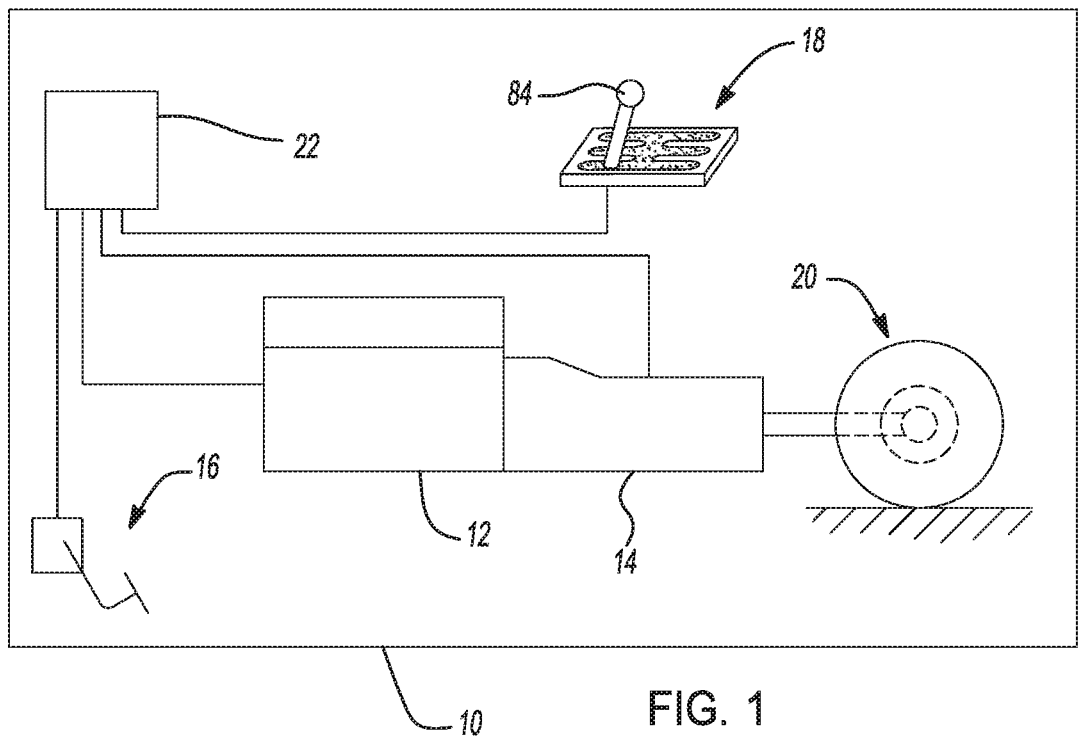
FIG. 1 is a schematic view of a vehicle according to the principles of the present disclosure.

Referring to the figures of the present disclosure, FIG. 1 illustrates a schematic of a vehicle which is generally indicated by the reference number 10. The vehicle 10 includes a motor 12, a transmission 14, a clutch pedal module 16, a gear selector module 18, a drivetrain 20, and a powertrain control module 22. More particularly, the motor 12 is an internal combustion engine (ICE) having an output member 24 (shown in FIG. 2) in the form of a flywheel. While this disclosure contemplates a vehicle 10 having an ICE motor 12, other torque generating units may be considered. For example, an electric motor may be employed as the motor without departing from the scope of the present disclosure.

The output member 24 of the motor 12 is selectively connected to an input of the transmission 14. The transmission 14 may be any type of automatic transmission 14, however, the present disclosure considers a dual clutch transmission 14. The dual clutch transmission 14 includes a first input clutch 26, a second input clutch 28, a first input shaft or member 30, a second input shaft or member 32, a first countershaft 34, a second countershaft 36, a plurality of gear sets 38, and a plurality of torque transmitting mechanisms 40. The first and second input shafts 30, 32 are selectively connected for common rotation and torque transfer with the output member 24 of the motor 12 through the first and second input clutches 26, 28. A first gear 42 of each of the plurality of gear sets 38 is connected for common rotation with one of the first and second input shafts 30, 32. A second gear 44 of each of the plurality of gear sets 38 is selectively connectable for common rotation with the first countershaft 34. A third gear 46 of each of the plurality of gear sets 38 is selectively connected for common rotation with the second countershaft 36. The second and third gears 44, 46 of each of the plurality of gear sets 38 are arranged to constantly mesh with the first gears 42, respectively.

In one example of the present disclosure, the plurality of torque transmitting mechanisms 40 include a first, second, third, and fourth two-way synchronizers 48, 50, 52, 54. However, other types of torque transmitting mechanisms may be considered such as disc clutches and brakes, dog clutches, and fluid couplings without departing from the scope of the disclosure. Each of the synchronizers 48, 50, 52, 54 selectively connect one of the second and third gears 44, 46 of the plurality of gear sets 38 to one of the first and second countershafts 34, 36. For example, a first forward gear ratio between the motor output member 24 and a transmission output member 56 when one of the first and second input clutches 26, 28 is engaged and one of the synchronizers 48, 50, 52, 54 is activated. In the dual clutch transmission 14 of the present disclosure, a total of eight forward gear ratios are selectively engaged. However, it is contemplated that the dual clutch transmission 14 could be configured, alternatively, to selectively engage another number of forward gear ratios, such as four, five, six, or seven forward gear ratios, by way of example. Additionally, a fifth synchronizer 58 is selectively engaged with a second gear 60 of another gear set 62 to achieve a reverse gear ratio between the motor output member 24 and a transmission output member 56.

The dual clutch transmission 14 also includes a plurality of actuators 64; one for each of the synchronizers 48, 50, 52, 54, 58. One of the plurality of actuators 64 is connected to one of the synchronizers 48, 50, 52, 54, 58 to move the synchronizers 48, 50, 52, 54, 58 into one of a first engaged position, a second engaged position (except for the fifth synchronizer 58), and a neutral position. The plurality of actuators 64 are each electronically connected to the powertrain control module 22.

Figure 2:
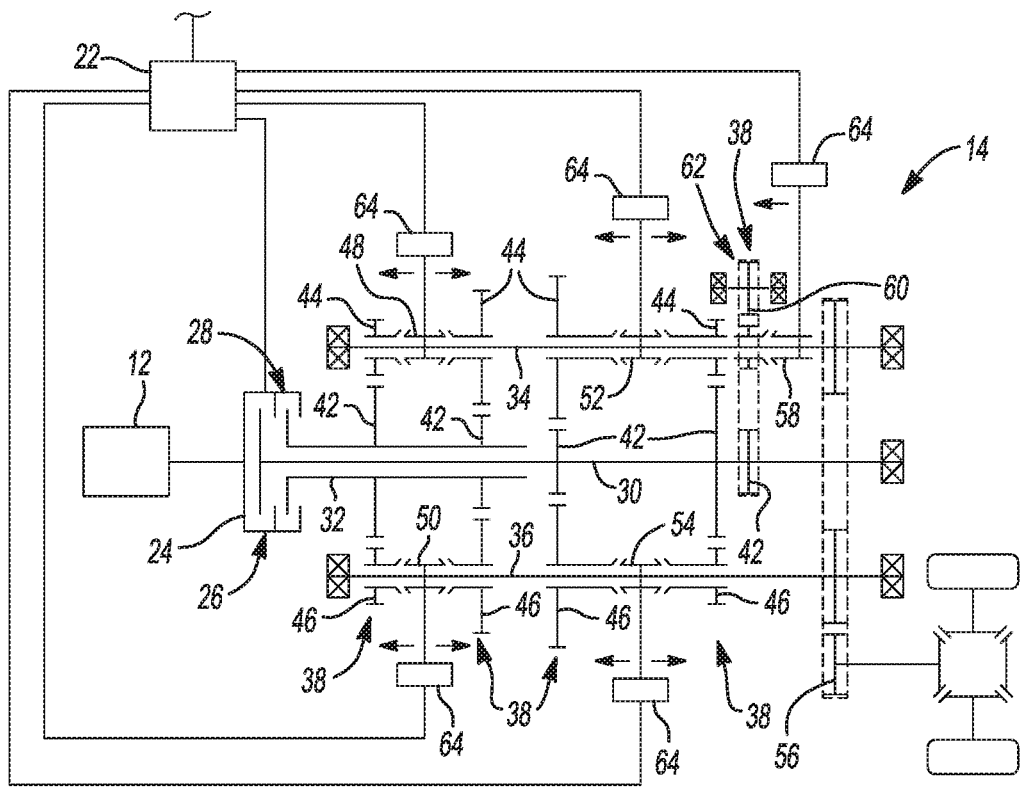
FIG. 2 is a schematic view of a dual clutch transmission according to the principles of the present disclosure.
Figure 3:
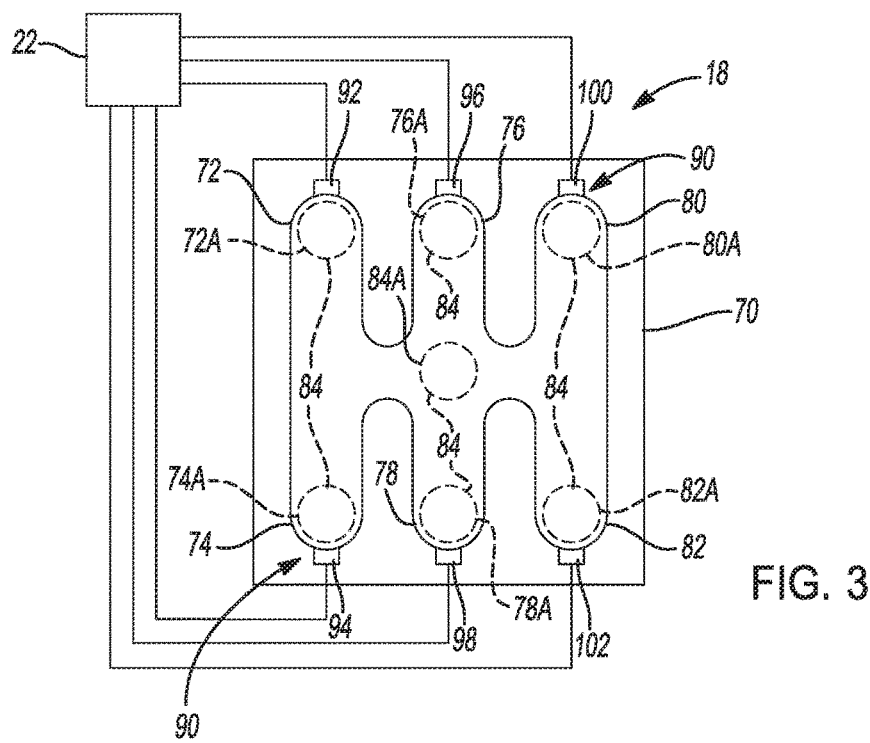
FIG. 3 is a schematic view of a gear selector according to the principles of the present disclosure.

Turning now to FIG. 3 with continuing reference to FIGS. 1 and 2, a portion of the gear selector module 18 is schematically illustrated. The gear selector module 18 is disposed between the driver and passenger front seats preferably on the top surface of a torque tunnel or other raised portion of the floor of the vehicle. The gear selector module 18 includes a plurality of gear selector sensors 90 and a series of selector gates or slots 70 depicting different gear ratio states of the dual clutch transmission 14. For example, a first gate 72 is selected by the driver when a first gear ratio of the dual clutch transmission 14 is desired. A second through fifth gates 74, 76, 78, 80 likewise represent a second through fifth gear ratios of the dual clutch transmission 14. A sixth gate 82 is selected by the driver when a reverse gear ratio of the dual clutch transmission 14 is desired. A gear shift lever 84 is selectively disposed in a selected position 72A, 74A, 76A, 78A, 80A, 82A in each of the gates 72, 74, 76, 78, 80, 82. When the gear shift lever 84 is in the neutral position 84A then the driver desires that the dual clutch transmission 14 is in neutral and there are not any gear ratios engaged.

The plurality of gear selector sensors 90 include each of a first, second, third, fourth, fifth, and reverse gear selector sensors 92, 94, 96, 98, 100, 102. The plurality of gear selector sensors 90 are each electronically connected to the powertrain control module 22 and communicate to the powertrain control module in which selected position 72A, 74A, 76A, 78A, 80A, 82A the gear shift lever 84 is disposed. While the gear selector module 18 illustrated in FIG. 3 is capable of operating a dual clutch transmission 14 having just five forward gear ratios and one reverse gear ratio, the present disclosure contemplates a gear selector module 18 capable of operating a dual clutch transmission 14 having fewer or more forward or reverse gear ratios.

Figure 4:
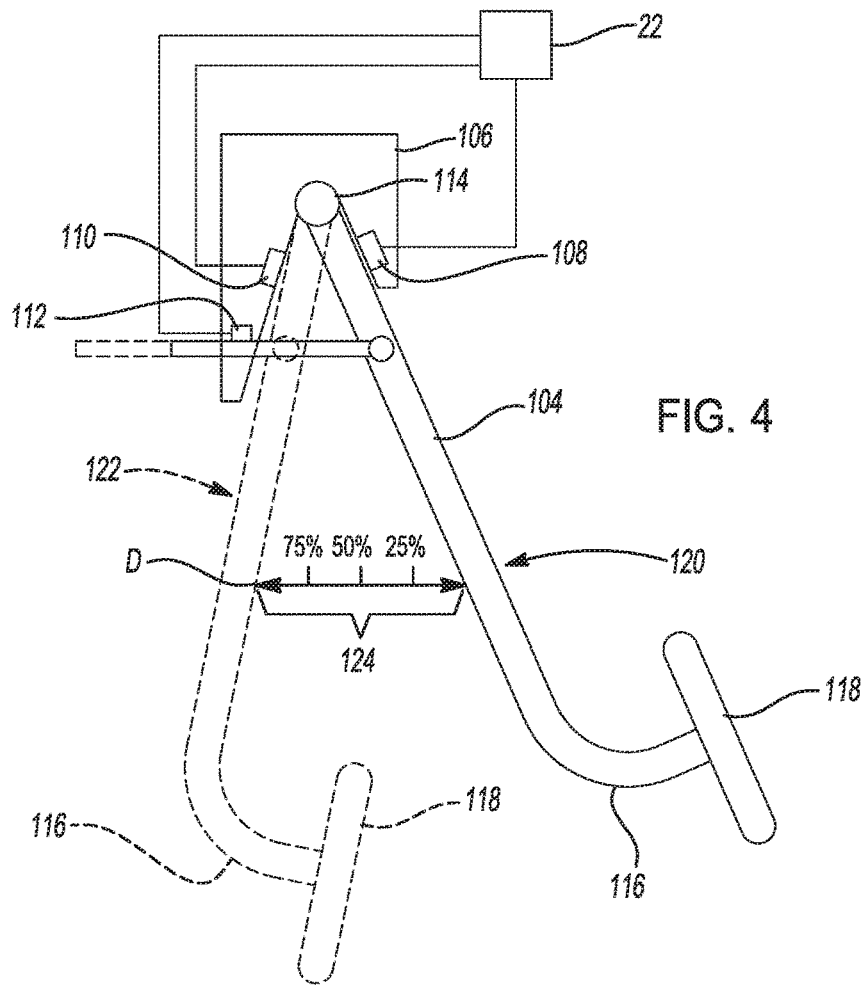
FIG. 4 is a schematic view of a clutch pedal according to the principles of the present disclosure.

Referring now to FIG. 4, the clutch pedal module 16 is illustrated in detail. The clutch pedal module 16 includes a clutch lever 104, a clutch pedal base 106, a first, second, and third clutch position sensors 108, 110, 112. The clutch pedal module 16 is disposed in the driver side foot well to next to the brake and accelerator pedals. More particularly, the clutch lever 104 is pivotably mounted on a first end 114 to the clutch pedal base 106. The second end 116 of the clutch lever 104 includes a foot pedal 118. The clutch lever 104 is selectively disposed in a first position 120, a second position 122, and any position in between 124 the first and second positions 120, 122. The first clutch position sensor 108 detects when the clutch lever 104 is disposed in the first position 120. The second clutch position sensor 110 detects when the clutch lever 104 is disposed in the second position 122.

The third clutch position sensor 112 detects when the clutch lever 104 is between the first and second positions 120, 122 as well as the exact position the clutch lever 104 is disposed. For example, if the clutch lever 104 is depressed a quarter of the distance D between the first and second positions 120, 122, then the third position sensor 112 detects that the clutch lever is 25% depressed. Likewise, if the clutch lever 104 is depressed a half or three quarters of the distance D between the first and second positions 120, 122, then the third position sensor 112 detects that the clutch lever is 50% and 75% depressed, respectively. Each of the clutch position sensors 108, 110, 112 are electronically connected to the powertrain control module 22.

The powertrain control module 22 is preferably an electronic control device having a preprogrammed digital computer or processor, control logic, memory used to store data, and at least one I/O peripheral. The control logic includes a plurality of logic routines for monitoring, manipulating, and generating data. The powertrain control module 22 controls the operation of each of the motor 12 and the dual clutch transmission 14. The control logic may be implemented in hardware, software, or a combination of hardware and software. For example, control logic may be in the form of program code that is stored on the electronic memory storage and executable by the processor. The powertrain control module 22 receives the output signals of several sensors throughout the motor 12, the dual clutch transmission 14, the clutch pedal module 16, and the gear selector module, performs the control logic, and sends command signals to the motor 12 and the dual clutch transmission 14. The motor 12 and the dual clutch transmission 14 receive command signals from the powertrain control module 22 and converts the command signals to control actions operable in the motor 12 and the dual clutch transmission 14. Some of the control actions include but are not limited to increasing motor 12 speed, changing air/fuel ratio, changing the dual clutch transmission 14 gear ratios, etc., among many other control actions.

For example, a control logic implemented in software program code that is executable by the processor of the powertrain control module 22 includes control logic for implementing a control method of operating the motor 12 and the dual clutch transmission in a manual gear selection mode.

Figure 5:
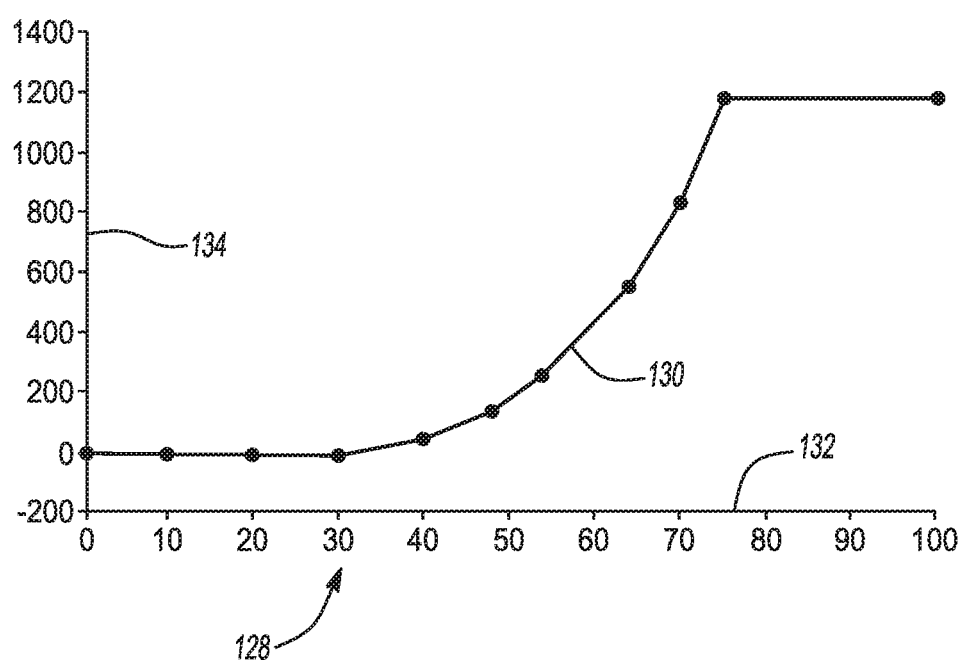
FIG. 5 is a chart depicting a relationship between clutch module engagement and torque transferred according to the principles of the present disclosure.

When the driver chooses to operate the motor 12 and dual clutch transmission 14 in the manual gear selection mode, a first of the plurality of input signals is a clutch position input signal and a second of the plurality of input signals is a gear lever position input signal. The control logic sequence includes a first control logic for selectively activating one of the first and second torque input clutches based on the clutch position signal and the gear lever position signal. For example, when the driver positions the gear shift lever 84 in the first gear ratio positions 72A the second input clutch 28 is set to be engaged. Preferably, the driver will also depress the clutch lever 104 of the clutch pedal module 16 to the second position 122 thus communicating to the powertrain control module 22 to fully disengage both of the first and second input clutches 26, 28 of the dual clutch transmission 14. As the driver releases the clutch lever 104, the powertrain control module 22 will engage the second input clutch 28 in proportion to the position of the clutch lever 104. For example, if the clutch lever 104 is 75% depressed, the second input clutch 28 will transfer 25% of the torque from the motor 12 to the second input shaft 32. Likewise, if the if the clutch lever 104 is 25% depressed, the second input clutch 28 will transfer 75% of the torque from the motor 12 to the second input shaft 32. Once the clutch lever 104 is completely released, 100% of the torque from the motor 12 is transferred to the second input shaft 32. In some examples, one of which is shown in FIG. 5, the powertrain control module 22 can be programed to adjust the relationship between percentages of the first and second input clutch 26, 28 engagement and clutch lever 104 position to more accurately depict a mechanical connection between the clutch lever 104 and the percentage of motor 12 torque that is transferred to the first and second input shafts 30, 32 of the dual clutch transmission 14. FIG. 5 illustrates a chart 128 depicting an example of the relationship between the percentage 132 of clutch lever 104 engagement and the amount of torque 134 transferred from the motor 12 to one of the first and second input shafts 32, 34 of the dual clutch transmission 14. The actual amount of torque transferred 130 per a particular clutch lever 104 position is shown. In the chart 128 100% depicts the clutch lever 104 fully released in the first position 120 while 0% depicts the clutch lever 104 fully depressed to the second position 122.

A second control logic selectively activates one of the plurality of torque transmitting mechanisms based on the gear lever position signal. When the driver positions the gear shift lever 84 in the first gear ratio positions 72A then one of the plurality of actuators 64 is commanded to shift one of the synchronizers 48 to engage one of the second gears 44 of one of the plurality of gear sets 38 to the first countershaft 34. This is preferably done before the driver releases the clutch lever 104 so that the first input shaft 32 is not rotating prior to engaging the synchronizer 48 and causing gear clash. However, the control logic can be arranged to prevent this from occurring.

While examples have been described in detail, those familiar with the art to which this disclosure relates will recognize various alternative designs and examples for practicing the disclosed structure within the scope of the appended claims.

The following is claimed:

1. A powertrain system of a vehicle, the powertrain system comprising:
   a clutch pedal module having a clutch pedal and a clutch sensor, and wherein the clutch pedal is selectively disposed in one of a first clutch position and a second clutch position;
   a gear selector module having a gear shift lever and a plurality of gear lever position sensors, and wherein the gear shift lever is selectively disposed in one of a plurality of forward gear positions and a reverse gear position;
   a powertrain control module having a control logic sequence, and wherein the powertrain control module is in electrical communication with each of the clutch sensor and the plurality of gear lever position sensors; and
   a transmission having a plurality of forward gear ratios and a reverse gear ratio, wherein the transmission is in electric communication with the powertrain control module, and wherein the transmission is a dual clutch transmission having a first torque input clutch, a second torque input clutch, and a plurality of torque transmitting mechanisms, and
   wherein the powertrain control module receives a plurality of input signals from the clutch sensor and the plurality of gear lever position sensors, operates the control logic sequence to convert the input signals to a plurality of transmission output signals, and communicates the plurality of transmission output signals to the transmission.

2. The powertrain system of claim 1 wherein the powertrain control module is also in electrical communication with a motor of the vehicle and the powertrain control module communicates a plurality of motor output signals generated by the control logic sequence to the motor.

3. The powertrain system of claim 1 wherein the plurality of forward gear positions include at least a first gear position, a second gear position, a third gear position, a fourth gear position, and a neutral position, and the plurality of gear lever position sensors include a first gear sensor for detecting when the gear shift lever is in the first gear position, a second gear sensor for detecting when the gear shift lever is in the second gear position, a third gear sensor for detecting when the gear shift lever is in the third gear position, a fourth gear sensor for detecting when the gear shift lever is in the fourth gear position, a neutral gear sensor for detecting when the gear shift lever is in the neutral position, and a reverse gear sensor for detecting when the gear shift lever is in the reverse gear position.

4. The powertrain system of claim 1 wherein the first clutch position is a fully disengaged clutch position, the second clutch position is a fully engaged clutch position, and a third clutch position is a partially engaged clutch position.

5. The powertrain system of claim 4 wherein the partially engaged clutch position is one of a 10% partially engaged clutch position, a 25% partially engaged clutch position, a 50% partially engaged clutch position, and a 75% partially engaged clutch position.

6. The powertrain system of claim 5 wherein the clutch sensor detects when the clutch pedal is disposed in one of the first, second, and third positions.

7. The powertrain system of claim 1 wherein a first of the plurality of input signals is a clutch position input signal, a second of the plurality of input signals is a gear lever position input signal, and the control logic sequence includes a first control logic for selectively activating one of the first and second torque input clutches based on the clutch position input signal and the gear lever position input signal.

8. The powertrain system of claim 7 wherein the control logic sequence includes a second control logic for selectively activating one of the plurality of torque transmitting mechanisms based on the gear lever position input signal.

9. A powertrain system of a vehicle, the powertrain system comprising:
a clutch pedal module having a clutch pedal and a clutch sensor, and wherein the clutch pedal is selectively disposed in one of a fully engaged clutch position, a fully disengaged clutch position, and a partially engaged clutch position;
a gear selector module having a gear shift lever and a plurality of gear lever position sensors, and wherein the gear shift lever is selectively disposed in one of a plurality of forward gear positions and a reverse gear position;
a powertrain control module having a control logic sequence, and wherein the powertrain control module is in electrical communication with each of the clutch sensor and the plurality of gear lever position sensors; and
a transmission having a plurality of forward gear ratios and a reverse gear ratio, and wherein the transmission is in electric communication with the powertrain control module;
a motor having an output member selectively connected for common rotation with one of a first input clutch and a second input clutch of the transmission, and wherein the powertrain control module is also in electrical communication with the motor; and
wherein the powertrain control module receives a plurality of input signals from the clutch sensor and the plurality of gear lever position sensors, operates the control logic sequence to convert the input signals to a plurality of transmission output signals and a plurality of motor output signals, communicates the plurality of transmission output signals to the transmission, and communicates the plurality of motor output signals to the motor.

10. The powertrain system of claim 9, wherein the plurality of forward gear positions include at least a first gear position, a second gear position, a third gear position, a fourth gear position, and a neutral position, and the plurality of gear lever position sensors include a first gear sensor for detecting when the gear shift lever is in the first gear position, a second gear sensor for detecting when the gear shift lever is in the second gear position, a third gear sensor for detecting when the gear shift lever is in the third gear position, a fourth gear sensor for detecting when the gear shift lever is in the fourth gear position, a neutral gear sensor for detecting when the gear shift lever is in the neutral position, and a reverse gear sensor for detecting when the gear shift lever is in the reverse gear position.

11. The powertrain system of claim 9 wherein the partially engaged clutch position is one of a 10% partially engaged clutch position, a 25% partially engaged clutch position, a 50% partially engaged clutch position, and a 75% partially engaged clutch position.

12. The powertrain system of claim 11 wherein the clutch sensor detects when the clutch pedal is disposed in one of the fully engaged clutch position, the fully disengaged clutch position, and one of the 10%, 25%, 50%, 75% partially engaged clutch positions.

13. The powertrain system of claim 9 wherein the transmission is a dual clutch transmission having a first torque input clutch, a second torque input clutch, and a plurality of torque transmitting mechanisms.

14. The powertrain system of claim 13 wherein a first of the plurality of input signals is a clutch position input signal, a second of the plurality of input signals is a gear lever position input signal, and the control logic sequence includes a first control logic for selectively activating one of the first and second torque input clutches based on the clutch position input signal and the gear lever position input signal.

15. The powertrain system of claim 14 wherein the control logic sequence includes a second control logic for selectively activating one of the plurality of torque transmitting mechanisms based on the gear lever position input signal.

16. A powertrain system of a vehicle, the powertrain system comprising:
a clutch pedal module having a clutch pedal and a clutch sensor, and wherein the clutch pedal is selectively disposed in one of a fully engaged clutch position, a fully disengaged clutch position, and a partially engaged clutch position, the clutch sensor detects when the clutch pedal is disposed in one of the fully engaged clutch position, the fully disengaged clutch position, and the partially engaged clutch position, and the partially engaged clutch position is one of a 10% partially engaged clutch position, a 25% partially engaged clutch position, a 50% partially engaged clutch position, and a 75% partially engaged clutch position;
a gear selector module having a gear shift lever and a plurality of gear lever position sensors, and wherein the gear shift lever is selectively disposed in one of a plurality of forward gear positions and a reverse gear position;
a powertrain control module having a control logic sequence, and wherein the powertrain control module is in electrical communication with each of the clutch sensor and the plurality of gear lever position sensors; and
a dual clutch transmission having a first torque input clutch, a second torque input clutch, a plurality of torque transmitting mechanisms, a plurality of forward gear ratios, and a reverse gear ratio, and wherein the dual clutch transmission is in electrical communication with the powertrain control module;
a motor having an output member selectively connected for common rotation with one of the first and second input clutches of the transmission, and wherein the powertrain control module is also in electrical communication with the motor; and
wherein the powertrain control module receives a plurality of input signals from the clutch sensor and the plurality of gear lever position sensors, operates the control logic sequence to convert the input signals to a plurality of transmission output signals and a plurality of motor output signals, communicates the plurality of transmission output signals to the dual clutch transmission, and communicates the plurality of motor output signals to the motor.

17. The powertrain system of claim 16 wherein the plurality of forward gear positions include at least a first gear position, a second gear position, a third gear position, a fourth gear position, and a neutral position, and the plurality of gear lever position sensors include a first gear sensor for detecting when the gear shift lever is in the first gear position, a second gear sensor for detecting when the gear shift lever is in the second gear position, a third gear sensor for detecting when the gear shift lever is in the third gear position, a fourth gear sensor for detecting when the gear shift lever is in the fourth gear position, a neutral gear sensor for detecting when the gear shift lever is in the neutral position, and a reverse gear sensor for detecting when the gear shift lever is in the reverse gear position.

18. The powertrain system of claim 17 wherein a first of the plurality of input signals is a clutch position input signal, a second of the plurality of input signals is a gear lever position input signal, and the control logic sequence includes a first control logic for selectively activating one of the first and second torque input clutches based on the clutch position input signal and the gear lever position input signal.

19. The powertrain system of claim 18 wherein the control logic sequence includes a second control logic for selectively activating one of the plurality of torque transmitting mechanisms based on the gear lever position input signal.

* * * * *